United States Patent [19]

Krusche

[11] 3,986,737
[45] Oct. 19, 1976

[54] ADAPTER

[75] Inventor: Kurt Krusche, Frankfurt am Main, Germany

[73] Assignee: Allstar Verbrauchsguter GmbH & Co. KG., Frankfurt am Main, Germany

[22] Filed: Apr. 28, 1975

[21] Appl. No.: 572,426

[30] Foreign Application Priority Data
May 29, 1974 Germany............................ 2426234

[52] U.S. Cl.................................. 285/341; 285/7; 285/346; 285/354
[51] Int. Cl.² ......................................... F16L 17/02
[58] Field of Search ............. 285/7, 8, 39, 162, 196, 285/338, 346, 342, 341, 354, 353, 348, 248, 177 X, 328, 423; 403/104, 342, 361; 279/1 Q, 56, 102

[56] References Cited
UNITED STATES PATENTS

| 989,304 | 4/1911 | Shaw | 285/354 X |
| 2,315,792 | 4/1943 | Hoss | 285/177 X |
| 2,431,120 | 11/1947 | Howe | 285/348 X |
| 2,469,198 | 5/1949 | LaPointe | 279/102 X |
| 2,869,883 | 1/1959 | Dunbar | 403/342 X |
| 3,178,206 | 4/1965 | Martin et al. | 285/423 X |
| 3,271,053 | 9/1966 | Kurachi | 285/8 |

FOREIGN PATENTS OR APPLICATIONS

| 616,577 | 10/1926 | France | 285/341 |

Primary Examiner—Dave W. Arola
Attorney, Agent, or Firm—Kurt Kelman

[57] ABSTRACT

An adapter for releasably coupling two tubular elements comprises a socket, a sleeve nut threadedly engaging the socket and an elastically deformable sleeve inserted in the sleeve nut. The socket consists of a smaller diameter and a larger diameter part, and the sleeve nut has an inner thread in threaded engagement with an outer thread on the larger diameter socket part. The axial length of the sleeve nut exceeds that of the larger diameter socket part, the inner thread is arranged at one sleeve nut end and an inwardly extending flange is at the opposite sleeve nut end. The sleeve is inserted in the sleeve nut between axially spaced shoulders formed by the flange and the larger diameter socket part. The outer diameter of the sleeve is slightly smaller than the inner diameter of the sleeve nut, the periphery of the sleeve defines a circumferentially extending trough-shaped recess, and the sleeve has a cylindrical inner wall.

8 Claims, 4 Drawing Figures

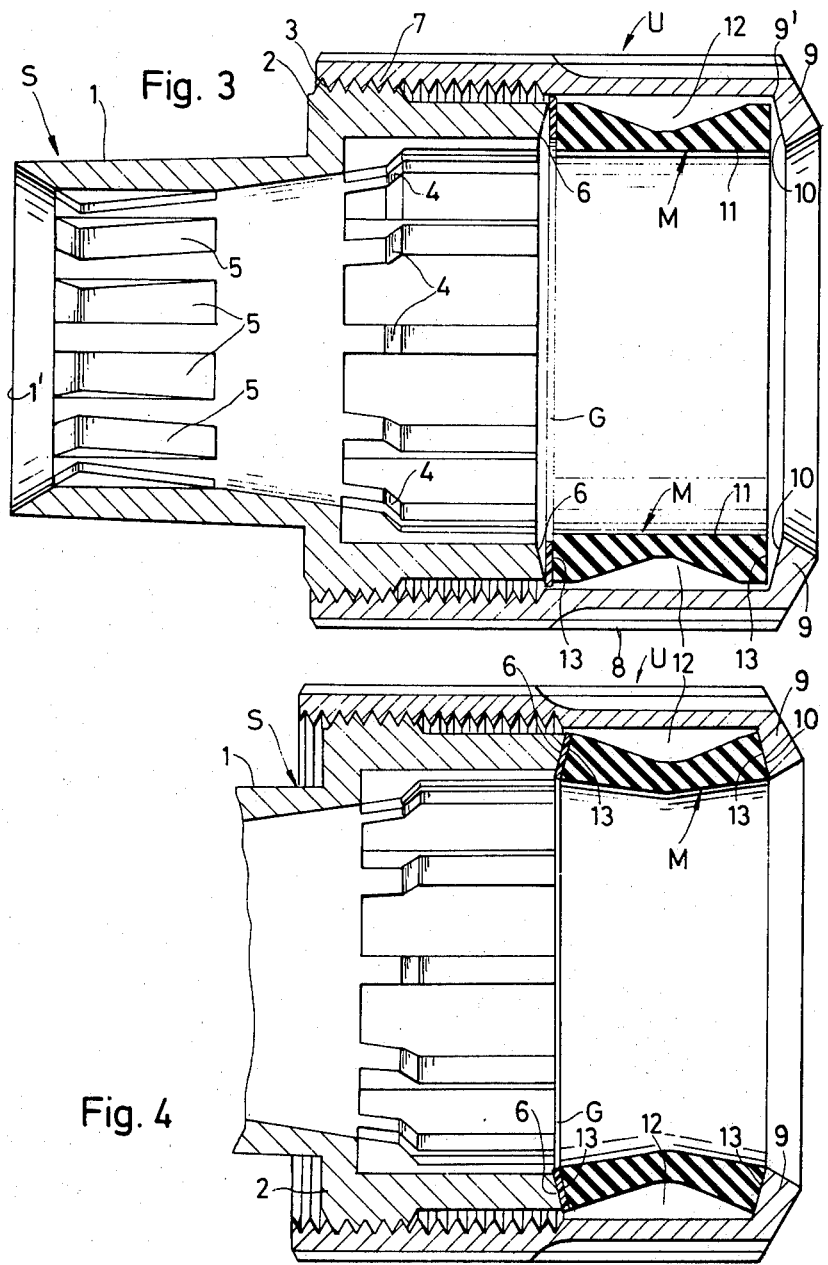

ADAPTER

The present invention relates to a universal adapter which is useful for releasably coupling two tubular elements which may be of different diameters, such as the connecting socket of a vacuum cleaner nozzle and the suction tube of the vacuum cleaner.

Known adapters of this type comprise a socket consisting of a first part of smaller diameter and a second part of larger diameter. The first socket part is dimensioned to fit frictionally into a first one of the tubular elements to form a seat therefor and the second socket part has an outer thread. A sleeve nut having an inner thread is in threaded engagement with the outer thread.

It is frequently desired releasably to couple tubular elements of different diameters, such as is the case in the connection of nozzles to the suction tube of a vacuum cleaner. A very simple releasable coupling for such a connection is an elastic sleeve of natural or synthetic rubbber, for example, which is simply pulled over the two ends of the tubular elements which are to be coupled. However, even if such an elastic sleeve has two parts of different diameters, its use is limited within rather narrow tolerances to the connection of tubes of rather specific diameters. Inserting the tube ends into the elastic sleeve presents some difficulties and, furthermore, the elastic sleeve will be permanently expanded during use until it no longer provides a friction fit for the tube ends to be coupled. When such an elastic sleeve is used for releasably coupling a nozzle to the suction tube of a vacuum cleaner, these disadvantages become rapidly evident since these vacuum cleaner parts are very frequently connected and disconnected. Various nozzles for different cleaning purposes are provided for vacuum cleaners, the diameters of the connecting sockets of many type of vacuum cleaner nozzles differing substantially from that of the suction tube. This requires an adapter.

In adapters of the above indicated type, the diameters of the socket and the sleeve nut are so dimensioned that one fits one of the tubular elements to be coupled while the other one fits the other tubular element. This means that the adapter may be used only for two specifically dimensioned tubular elements.

It is the primary object of this invention to provide a universal adapter useful for releasably coupling tubular elements of varying dimensions in a fluid-tight manner, which is easy to handle, and readily connected and disconnected.

The above and other objects and advantages are accomplished in an adapter of the indicated type by providing a sleeve nut having an axial length exceeding that of the second socket part. The inner thread is arranged at one end of the sleeve nut and an inwardly extending flange is at an end of the sleeve nut opposite to the one sleeve nut end, the flange and the second socket parts presenting axially spaced shoulders. An elastically deformable sleeve is inserted in the sleeve nut between the shoulders. The sleeve has a maximum outer diameter which is slightly smaller than the inner diameter of the sleeve nut, the sleeve has a periphery defining a circumferentially extending trough-shaped recess, and the sleeve has a cylindrical inner wall dimensioned to receive the second tubular element.

The objects, advantages and features of the invention will become more apparent from the following detailed description of a now preferred embodiment thereof, taken in conjunction with the accompanying drawing wherein FIG. 1 is an exploded view of the three main parts of the universal adapter of the present invention;

FIG. 3 is an axial section along plane X—X of FIG. 2;

FIG. 4 is a like partial sectional view of the adapter, showing the sleeve nut axially displaced in relation to the socket to deform the elastic sleeve.

Figure 1:
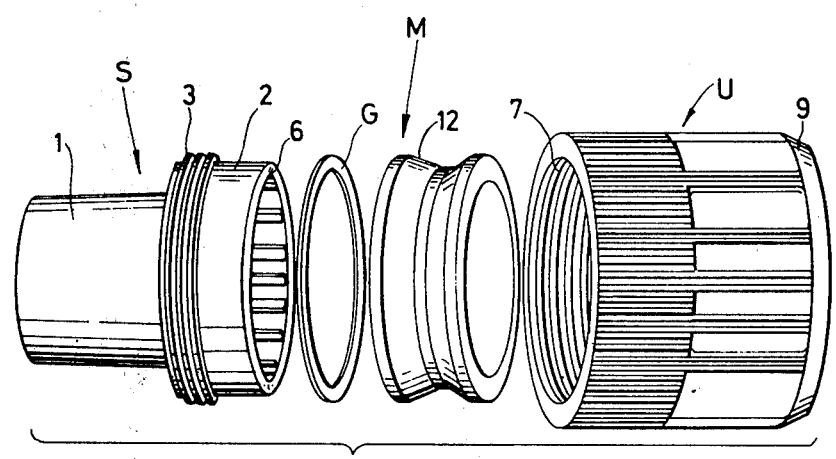
Figure 2:
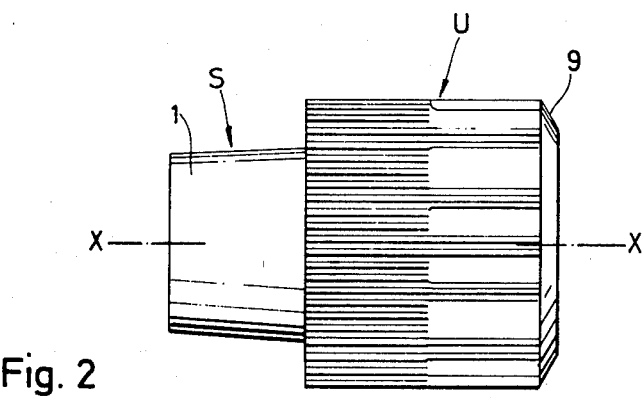
FIG. 2 is a side elevational view of the assembled adapter.

Referring now to the drawing, the universal adapter is shown to consist essentially of socket S, sleeve nut U and elastically deformable sleeve M. In the illustrated embodiment and preferably, slip ring G is provided to reduce friction between the socket and/or the sleeve nut and thus to improve the operation of the adapter.

Socket S consists of first part 1 of smaller diameter and second part 2 of larger diameter. Socket part 1 is dimensioned to fit frictionally into a first tubular element (not shown) and to form a seat therefor, an annular peripheral shoulder being formed between the first and second socket parts. Socket part 2 has outer thread 3 adjacent the shoulder between the socket parts. While the outer thread has been shown to extend only a short axial distance along the periphery of socket part 2, it may extend along the entire periphery thereof, if desired. Normally, however, three or four thread courses may be sufficient for threaded engagement with inner thread 7 arranged at one end of sleeve nut U. As shown, it may be desirable and preferred to make socket part 1 slightly conical to provide a secure seat for a connecting nozzle of a vacuum cleaner nozzle, for instance.

The free edge of socket part 2 remote from socket part 1 forms shoulder 6 which, as illustrated, preferably slopes downwardly into the interior of the socket. A seat 4 for the second tubular element (not shown) is provided at the bottom of the interior of second socket part 2 leading into the first second part. This enables the second tubular element to be centered in socket part 2. Seat 4 slopes inwardly and downwardly towards socket part 1. In the illustrated embodiment, the seat is formed by an array of ribs which have sloping shoulders 4. If desired, however, the seat could be formed by a continuous ring.

To enable first socket part 1 frictionally to fit a tubular element of much smaller diameter, the interior of this part of socket S adjacent free end 1' remote from second socket part 2 tapers conically inwardly towards the free end. In the illustrated embodiment, this inwardly tapering configuration has the form of an array of inwardly tapering ribs 5 arranged annularly adjacent free end 1'. In this manner, the inner diameter of socket part 1 is gradually reduced towards its free end so that the outer end of a tubular end insert thereinto will find its seat as it is moved into the socket. In this manner, the smallest inner diameter of socket part 1 determines what types of tubular elements may be coupled to the socket by sleeve nut U, as far as their diameters are concerned. Of course, this depends also on the diameter of elastic sleeve M and the sleeve nut, these three parts being dimensioned accordingly but always being capable of considerable tolerances.

The second part of the universal adapter is sleeve nut U whose inner diameter is so selected that its inner thread 7 is in threaded engagement with outer thread 3 of part 2 of socket S. The inner thread is arranged at one end of the sleeve nut and, as illustrated, preferably has more courses than outer thread 3. This enables a relatively wide range of axial displacement of the nut in respect of the socket.

Inwardly extending flange 9 is arranged at an end of sleeve nut U opposite to the one end and presents shoulder 10 axially spaced from shoulder 6. Shoulder 10 slopes from annular 9' upwardly into the interior of the sleeve nut, i.e. in a direction opposite to the slope of shoulder 6, so that the two shoulders converge towards each other in a radially outward direction. These converging shoulders constitute the seat for elastically deformable sleeve M.

This third essential part of the universal adapter has a special configuration according to the present invention. The sleeve has a maximum outer diameter which is slightly smaller than the inner diameter of sleeve nut U. Its periphery defines a circumferentially extending trough-shaped recess which is illustrated to have a broad V-shaped cross section 12. If desired, it may have an equivalent arcuate shape. Generally, recess 12 is defined by a pair of walls sloping symmetrically upwardly from a center point of the sleeve towards the respective ends thereof. End faces 13, 13 of sleeve M extend parallel to each other and perpendicularly to the axis of the sleeve (see FIG. 3).

Since the outer diameter of the sleeve is a little smaller than the inner diameter of the sleeve nut, it may be freely inserted into, and removed from, the sleeve nut, being loosely held between shoulders 6 and 10 when not deformed. At this stage, the inner wall of the sleeve is cylindrical, being so dimensioned as to receive a second tubular element (not shown) and having substantially the same diameter as that of the adjoining interior of socket part 2.

Slip ring G is mounted between one of the end faces 13 of the elastically deformable sleeve and a respective shoulder, in the illustrated embodiment shoulder 6. Such a slip ring will reduce friction when the sleeve nut is screwed onto socket S and accordingly reduces the force needed to turn the sleeve nut.

As sleeve nut U is driven home on socket S, as shown in FIG. 4, elastic sleeve U is deformed between approaching shoulders 6 and 10. Parallel end faces 13, 13 move into contact with the sloping shoulders 6, 10 and the constricted central portion of sleeve M will be pressed inwardly, this deformation increasing the farther the sleeve nut is displaced axially towards the socket. This accordingly decreases the inner diameter of sleeve M until it conforms to the outer diameter of the second tubular element inserted thereinto. During this movement, synthetic resin slip ring G conforms to the shoulder and end face between which it is disposed.

When the sleeve nut is axially displaced in the opposite direction, the deformation of elastic sleeve M gradually decreases again to assume finally its original shape, thus releasing the inserted tubular element and enabling it to be removed from the adapter.

Operation of the sleeve nut is facilitated by providing the same with a knurled periphery so that it may be gripped with ease.

The socket and sleeve nut may be made of metal or, preferably, a suitable rigid synthetic resin. The elastically deformable sleeve will usefully be made of a natural or synthetic rubber.

The universal adapter hereinabove described is very easy to operate and makes it possible to couple releasably and fluid-tightly tubular elements with diameters of considerably different magnitudes. The adapter parts may be stored in assembled condition ready for use. In use with a vacuum cleaner, for instance, socket part 1 is simply inserted into the connecting socket of the nozzle, or the connecting socket is inserted into socket part 1 through free end 1'. Either way, the connecting socket is frictionally held on socket S. The suction tube of the vacuum cleaner is now inserted into the sleeve nut and is moved inwardly until its end is centered within the sleeve nut either by seat 4 or, if the diameter of the suction tube is smaller, by conically inwardly tapering ribs 5. In other words, the extent of the inward movement of the suction tube depends on its diameter. After the suction tube has been inserted and centered, sleeve nut U is driven home to deform elastic sleeve M in the manner illustrated in FIG. 4 until the deformed sleeve grips the suction tube and holds it in its centered position, thus establishing a fluid-tight connection between the connecting socket of the nozzle and the suction tube. Release of the suction tube is readily attained simply by turning the sleeve nut in the opposite direction to release the suction tube from the grip of sleeve M.

What is claimed is:
1. In an adapter for releasably coupling two tubular elements, which comprises a socket consisting of a first part of smaller diameter and a second part of larger diameter, the first socket part being dimensioned to fit frictionally a first one of the tubular elements to form a seat therefor and the second socket part having an outer thread, and a sleeve nut having an inner thread in threaded engagement with the outer thread:
   1. the sleeve nut having an axial length exceeding that of the second socket part,
      a. the inner thread being arranged at one end of the sleeve nut and
      b. an inwardly extending flange at an end of the sleeve nut opposite to the one sleeve nut end, the flange and the second socket part presenting axially spaced shoulders sloping so that they converge towards each other in a radially outward direction, and
   2. an elastically deformable solid sleeve of natural or synthetic rubber inserted in the sleeve nut between the shoulders,
      a. the sleeve having a maximum outer diameter which is slightly smaller than the inner diameter of the sleeve nut,
      b. the sleeve having a periphery defining a circumferentially extending trough-shaped recess,
      c. the sleeve having a cylindrical inner wall dimensioned to receive the second tubular element, and
      d. the sleeve having two annular end faces extending parallel to each other and peripendicularly to the axis of the sleeve for engagement with the shoulders.

2. In the adapter of claim 1, the recess in the periphery of the sleeve being defined by a pair of walls sloping symmetrically upwardly from a center point of the sleeve towards the respective ends thereof.

3. In the adapter of claim 1, a slip ring of synthetic resin inserted between a respective end of the sleeve and one of the shoulders.

4. In the adapter of claim 1, a seat for the second tubular element at the bottom of the interior of the second socket part and leading into the first socket part.

5. In the adapter of claim 4, the seat sloping inwardly towards the first socket part.

6. In the adapter of claim 1, the first socket part having a free end remote from the second socket part and the interior of the first socket part tapering conically inwardly towards the free end.

7. In the adapter of claim 6, an array of inwardly tapering ribs in the interior of the first socket part adjacent the free end whereby the first socket part tapers conically inwardly towards the free end.

8. In the adapter of claim 1, the sleeve nut having a knurled periphery.

* * * * *